United States Patent [19]

Plimon et al.

[11] Patent Number: 5,384,467
[45] Date of Patent: Jan. 24, 1995

[54] OPTOELECTRONIC MEASURING DEVICE FOR MONITORING A COMBUSTION CHAMBER

[75] Inventors: Anton Plimon, Graz; Harald A. Philipp, Wegersfeld; Ernst Winklhofer, St. Johann ob Hohenburg/Stmk., all of Austria

[73] Assignee: AVL Gesellschaft für Verbrennungskraftmaschinen und Messtechnik m.b.H. Prof.Dr.Dr.h.c. Hans List, Graz, Austria

[21] Appl. No.: 135,554

[22] Filed: Oct. 14, 1993

[30] Foreign Application Priority Data

Oct. 16, 1992 [AT] Austria ................ 2047/92

[51] Int. Cl.6 ............................... H01J 5/16
[52] U.S. Cl. .................. 250/554; 250/227.2
[58] Field of Search ............ 250/554, 227.21, 227.23, 250/227.24, 573, 574, 227.11, 227.2, 227.28; 73/116; 340/578

[56] References Cited

U.S. PATENT DOCUMENTS

| | | | |
|---|---|---|---|
| 3,978,720 | 9/1976 | Ford | 73/116 |
| 4,422,323 | 12/1983 | Linder et al. | 73/116 |
| 4,947,680 | 8/1990 | McDougal | 73/116 |
| 4,978,850 | 12/1990 | Nakamura et al. | 250/227.11 |

FOREIGN PATENT DOCUMENTS 0325917 8/1989 European Pat. Off. .

*Primary Examiner*—David C. Nelms

[57] ABSTRACT

An optoelectronic measuring device for the purpose of observing and recording combustion processes in the combustion chamber of an internal combustion engine during operation, includes optical sensors directed at the combustion chamber and connected to an evaluation unit. The optical sensors are integrated in a sealing element positioned in a plane cutting the combustion chamber, which will permit the performance of measurements without any modifications of the engine or the geometry of the combustion chamber.

14 Claims, 2 Drawing Sheets

OPTOELECTRONIC MEASURING DEVICE FOR MONITORING A COMBUSTION CHAMBER

BACKGROUND OF THE INVENTION

This invention relates to an optoelectronic measuring device which is used for monitoring combustion processes in the combustion chamber of an internal combustion engine during operation with optical sensors covering the combustion chamber, the optical sensors being connected to an evaluation unit.

DESCRIPTION OF THE PRIOR ART

In engine development the knowledge of the temporal and spatial development of combustion processes is of vial importance. Previous methods of diagnosis basically include flame photography (using high-speed films) and measuring techniques employing optical fibers in selected sites of the engine.

If flame photography is used in engines, comparatively large windows or suitable openings for introduction of an endoscope are required. Windows of a satisfactory size are practical only in test motors, however, which can only be operated in a very limited speed and load range. Besides, the addition of windows will decisively change the heat conduction behavior of combustion chambers in certain spots, making such experiments somewhat doubtful, for instance, when knocking is to be investigated.

The greatest problem in flame photography is, however, to record a large number of short-exposure images with sufficient sensitivity A high image frequency inevitably is accompanied by intensity problems.

As regards optical fibers, a technique is described in EP-A 0 325 917, where optical sensors are integrated into the combustion recess of an engine piston, and where the signals of these sensors are transmitted via light guides and a coupling interface from the movable piston to the stationary part of the internal combustion engine. To permit a meaningful observation of the combustion process a number of probes, totalling 25 in the particular variant described, are distributed over the combustion recess. Such a system is complicated and expensive, and is practical in special test motors only.

SUMMARY OF THE INVENTION

It is an object of the invention to provide an improved measuring system based on known optoelectric devices which is suitable for use in commercially available engines without necessitating major modifications of the engine or the gemometry of the combustion chamber.

This is achieved in the invention by placing the optical sensors in a sealing element bounding the combustion chamber, which element is positioned in a plane cutting the combustion chamber. By arranging the optical sensors in the sealing element no modifications of the engine will be necessary, and the operating range of the engine, i.e., speed and load, will remain unrestricted. Furthermore, no bores or openings will be required in the piston or in the cylinder head. The measuring device of the invention will permit the observation and recording of combustion processes for sufficiently long periods and with the necessary temporal and spatial resolution, electronic instrumentation relying solely on standard components.

In a first simple variant of the invention, for the purpose of generating a one-dimensional image of the combustion processes, the sensors are directed at sections of the interior diameter of the sealing element adjacent to each other. After evaluation of the signals, observation of the combustion process may take place along this line.

The main application of the invention, however, provides that, for the purpose of generating a two-dimensional image of the combustion processes, the sensors have acceptance angle areas covering the area of the combustion chamber located in the cutting plane in a suitably uniform way, the evaluation unit comprising a processor for the purpose of calculating brightness values for defined areas of the cutting plane from the signals of the individual sensors, and converting them into a two-dimensional image. The signals of the individual sensors may be converted into two-dimensional images using known algorithms for emission tomography, image resolution being basically limited only by the number of sensors employed.

In a further development of the invention the individual sensors are combined into groups, each group being provided with a flat mounting bracket which is integrated in the sealing element and holds several sensors, the acceptance angle areas A of the individual sensors of a group covering the combustion chamber like a fan. In the invention the individual groups are positioned in the sealing element so as to leave openings in the sealing element, for instance, for the passage of oil and water. In this way the measuring device of the invention is easily adapted to the local conditions prevailing in the engine to be monitored.

In the measuring device of the invention each sensor may be configured as a spherical lens held in the mounting bracket, which is in optical contact with a light guide held by the bracket, the magnitude of the acceptance angle of the sensor being adjustable by selection of the distance between light guide and spherical lens.

For protection of the light guides the invention provides that glass fibers be used that are guided in metal tubes.

In a particularly advantageous variant of the invention the spherical lenses are placed in bores whose axes are normal to the axes of the bores for the light guides, and further that the spherical lenses are protected against pressure forces by elastic washers, preferably of teflon, which are placed on both sides of the lenses, and further thin metal foils are attached to both sides of the mounting bracket, preferably with an adhesive.

BRIEF DESCRIPTION OF THE DRAWINGS

The invention will be further described by way of example only with reference to the accompanying drawings, in which.

DETAILED DESCRIPTION OF THE PREFERRED EMBODIMENT

Figure 1:
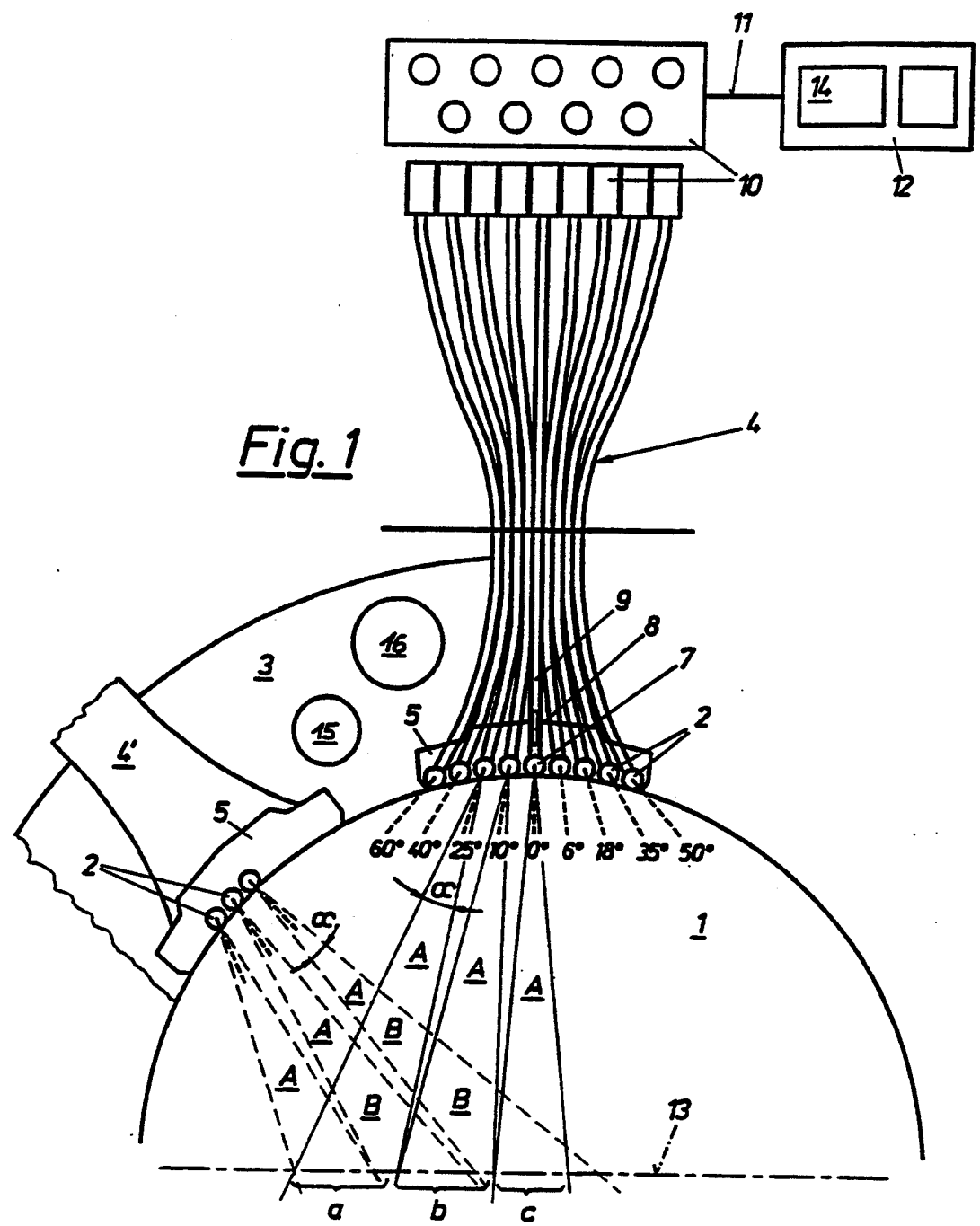
FIG. 1 is a schematic view of a measuring device as described by the invention for the observation and recording of combustion processes in the combustion chamber of an internal combustion engine.

The optoelectronic measuring device of FIG. 1 for monitoring combustion processes in the combustion chamber 1 of an internal combustion engine (not shown here), has a number of optical sensors 2 which are integrated in a sealing element 3, for instance, a cylinder head gasket.

The individual sensors may be combined into groups 4, 4', . . . , each group 4, 4', . . . comprising a mounting bracket 5 holding several sensors 2, which is integrated in the sealing element 3. The individual sensors 2 pick up the light from the combustion chamber 1 via an aperture 6 and a spherical lens 7 behind it. The spherical lens, which is made of quartz or sapphire, for example, is in optical contact with a light guide 8, i.e., a glass fiber placed in a metal tube 9. The diameter of the aperture 6, the imageing characteristics of the spherical lens 7, the fiber diameter and the distance between glass fiber and spherical lens will define a solid angle or acceptance angle $\alpha$ of approximately 5°, from which light may be coupled into the light guide. By means of glass fibers protected by metal tubes 9, the light is transmitted via connectors 10 and a further light guide 11 to a detector-amplifier unit located in an evaluation unit 12, and is converted into an electric signal.

In a simple variant of the invention the sensors 2 of a group 4 are directed at adjacent sections a,b,c, . . . of an imaginary line 13 in the cutting plane of the sealing element 3, for the purpose of generating a one-dimensional image of the combustion processes. In this manner the propagation of the flame front in special directions, or rather inhomogeneities of this propagation, may be determined, the directions being chosen by arranging the groups 4 in a certain way.

In the preferred application of the invention, however, the sensors 2 are arranged in the sealing element 3 so as to permit tomographic evaluation of the signals. For this purpose configurations are chosen in which the acceptance angle areas A of the individual sensors 2 cover the area of the combustion chamber 1 defined by the sealing plane as uniformly as possible. The acceptance angle areas A intersect in areas B; for the sake of simplicity only two groups 4, 4' out of a multitude are represented in this drawing. The signals of the individual sensors are digitally recorded at an adequate speed with the use of a multi-channel recording system. The data obtained in this manner are then processed by a processor 14 of the evaluation unit 12 using known tomographic algorithms, thus permitting determination of the light emission in the sectional plane of the cylinder head gasket. To permit satisfactory localization of the combustion processes some one hundred sensors are typically employed. For example, eleven groups of nine sensors each may be provided.

These groups are adapted to suit the local conditions, i.e., the geometry of the engine to be monitored. The individual groups 4, 4', . . . may be arranged so as to leave openings 15, 16 in the sealing element 3, for instance, for the passage of oil and water, or for fastening bolts.

Figure 2:
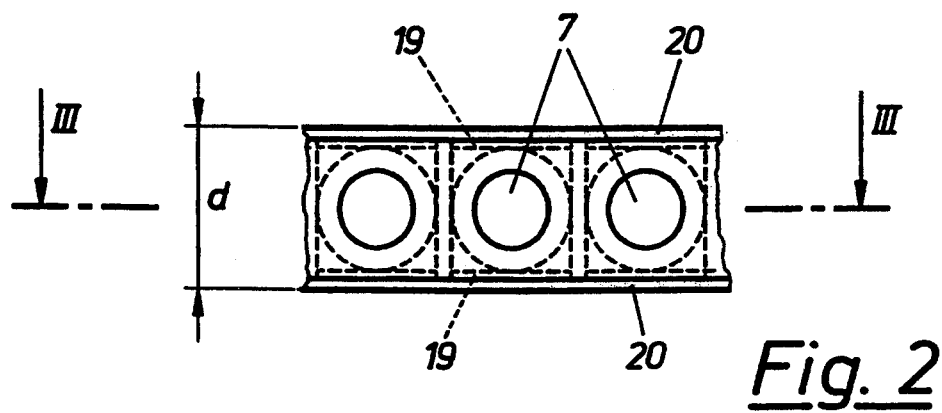
FIGS. 2 and 3 show details from FIG. 1.
Figure 3:
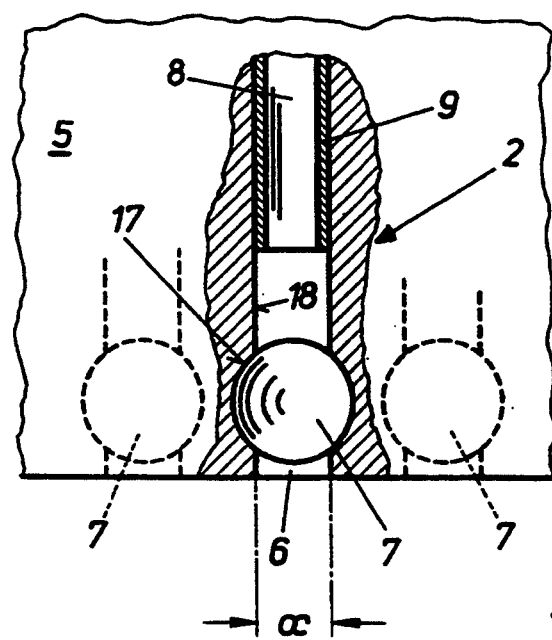

FIGS. 2 and 3 show the sensors 2 in greater detail, FIG. 2 giving a front view, and FIG. 3 a section along line III—III in FIG. 2.

For protection against the initial stresses in the sealing element, the spherical lens 7 is provided with an elastic washer 19 on either side, i.e., in its bore 17 normal to the bore 18 for the light guide 8. These washers 19, which may be made of teflon, are protected and held by metal foils 20 which are attached to both sides of the mounting bracket 5 by means of an adhesive. The total thickness d may be adjusted to the respective thickness of the cylinder head gasket, and is approximately 2 mm.

We claim:

1. Optoelectronic measuring device for monitoring combustion processes in a combustion chamber of an internal combustion engine during operation, comprising optical sensor means and an evaluation unit connected to said optical sensor means, wherein said optical sensor means are placed in a sealing element bounding said combustion chamber, which sealing element is positioned in a plane cutting said combustion chamber, wherein said sensor means are directed at adjacent sections of an interior diameter of said sealing element for the purpose of generating a one-dimensional image of said combustion processes.

2. Measuring device according to claim 1, wherein said sensor means are combined into groups, each of said groups being provided with a first mounting bracket which is integrated in said sealing element and holds several of said sensor means, the acceptance angle areas of all sensor means of each of said groups spanning said combustion chamber.

3. Measuring device according to claim 2, wherein each of said sensor means comprises a spherical lens held in said flat mounting bracket, said lens being in optical contact with a light guide held by said flat mounting bracket, the magnitude of the acceptance angle of said sensor means being adjustable by selection of the distance between said light guide and said spherical lens.

4. Measuring device according to claim 3, wherein said light guides are glass fibers guided in metal tubes.

5. Measuring device according to claim 3, wherein said spherical lenses are placed in bores whose axes are normal to the axes of bores for said light guides, and wherein said spherical lenses are protected against pressure forces by elastic washers which are placed on both sides of said lenses, and wherein thin metal foils are attached to both sides of said mounting bracket with an adhesive.

6. Measuring device according to claim 2, wherein said groups of sensor means are positioned in said sealing element so as to leave openings in said sealing element for conduits for oil and water.

7. Measuring device according to claim 1, wherein said optical sensor means are located in a cylinder head gasket of an internal combustion engine.

8. Optoelectronic measuring device for monitoring combustion processes in a combustion chamber of an internal combustion engine during operation comprising optical sensor means and an evaluation unit connected to said optical sensor means, wherein said optical sensor means are placed in a sealing element bounding said combustion chamber, which sealing element is positioned in a plane cutting said combustion chamber, wherein said sensor means have acceptance angle areas covering an area of said combustion chamber located in said cutting plane in a suitably uniform way for the purpose of generating a two-dimensional image of said combustion processes, and wherein said evaluation unit comprises a processor for the purpose of calculating brightness values for defined areas of said cutting plane from signals of said optical sensor means and converting said signals into a two-dimensional image.

9. Measuring device according to claim 8, wherein said sensor means are combined into groups, each of said groups being provided with a first mounting bracket which is integrated in said sealing element and holds several of said sensor means, the acceptance angle areas of all sensor means of each of said groups spanning said combustion chamber.

10. Measuring device according to claim 9, wherein each of said sensor means comprises a spherical lens held in said flat mounting bracket, said lens being in optical contact with a light guide held by said flat mounting bracket, the magnitude of the acceptance angle of said sensor means being adjustable by selection of the distance between said light guide and said spherical lens.

11. Measuring device according to claim 11, where said light guides are glass fibers guided in metal tubes.

12. Measuring device according to claim 10, wherein said spherical lenses are placed in bores whose axes are normal to the axes of bores for said light guides, and wherein said spherical lenses are protected against pressure forces by elastic washers which are placed on both sides of said lenses, and wherein thin metal foils are attached to both sides of said mounting bracket with an adhesive.

13. Measuring device according to claim 9, wherein said groups of sensor means are positioned in said sealing element so as to leave openings in said sealing element for conduits for oil and water.

14. Measuring device according to claim 8, wherein said optical sensor means are located in a cylinder head gasket of an internal combustion engine.

* * * * *